United States Patent
Athanasiou et al.

(10) Patent No.: US 7,260,884 B2
(45) Date of Patent: Aug. 28, 2007

(54) METHOD OF MANUFACTURING A DRUM ASSEMBLY ASSOCIATED WITH VIDEO TAPE MACHINE

(75) Inventors: George Athanasiou, Burlingame, CA (US); Constantine Athanasiou, South San Francisco, CA (US)

(73) Assignee: Athan Corporation, South San Francisco, CA (US)

( * ) Notice: Subject to any disclaimer, the term of this patent is extended or adjusted under 35 U.S.C. 154(b) by 306 days.

(21) Appl. No.: 10/414,820

(22) Filed: Apr. 15, 2003

(65) Prior Publication Data

US 2004/0205957 A1    Oct. 21, 2004

(51) Int. Cl.
*G11B 5/127* (2006.01)
*H04R 31/00* (2006.01)

(52) U.S. Cl. ............... 29/603.03; 29/603.01; 29/603.15; 29/603.16; 29/603.18; 360/83; 360/84; 360/90; 360/251.5; 360/261; 360/271.5; 360/241; 451/5; 451/41

(58) Field of Classification Search ............. 29/603.01, 29/603.03, 603.15, 603.16, 603.18; 360/83, 360/84, 90, 251.5, 261, 271.5–271.8, 241; 427/127, 128; 451/4, 51
See application file for complete search history.

(56) References Cited

U.S. PATENT DOCUMENTS

| | | | |
|---|---|---|---|
| 3,661,311 A | 5/1972 | Warren | |
| 3,955,215 A | 5/1976 | Hosoi | |
| 3,981,024 A | 9/1976 | Mo et al. | |
| 4,048,661 A | 9/1977 | Staar | |
| 4,079,491 A * | 3/1978 | Richardson | ............ 29/890.122 |
| 4,131,925 A | 12/1978 | Firth et al. | |
| 4,524,402 A | 6/1985 | Ueda et al. | |
| 4,636,887 A * | 1/1987 | Kato et al. | .................... 360/85 |

(Continued)

FOREIGN PATENT DOCUMENTS

JP        06195656 A  *  7/1994

(Continued)

OTHER PUBLICATIONS

"Characterization and measurement of nonlinear bit shifts in digital magnetic tape recording"; Wong-Lam, H.W.; Video, Audio and Data Recording, 1990; Apr. 24-26, 1990; pp. 84-92.*

(Continued)

*Primary Examiner*—Paul D. Kim
(74) *Attorney, Agent, or Firm*—Beyer Weaver LLP

(57) ABSTRACT

A method of manufacturing a drum assembly associated with a digital betacam video tape machine is disclosed. The method includes providing a helical scan drum assembly having a stationary upper drum, a stationary lower drum and a plurality of rotating read/write heads disposed between the stationary upper and lower drums. The rotating read/write heads reading and writing digital information to and from a tape. The method further includes inserting air grooves in the outer peripheral surface of the upper drum. The air grooves are configured to reduce sticktion between the tape and the outer peripheral surface of the upper drum when the tape is moved around the outer peripheral surface of the upper drum. The method additional includes mounting an adjustable band to the outer peripheral surface of the lower drum. The adjustable band is configured to guide the tape around the drum assembly in accordance with helical scans when the tape is moved around the outer peripheral surface of the upper drum.

40 Claims, 13 Drawing Sheets

U.S. PATENT DOCUMENTS

| | | | |
|---|---|---|---|
| 4,786,011 A | 11/1988 | Fujiwara et al. | |
| 4,881,145 A | 11/1989 | Hathaway | |
| 4,891,726 A | 1/1990 | Suwa et al. | |
| 5,013,580 A * | 5/1991 | Meunier et al. | 427/569 |
| 5,041,937 A | 8/1991 | Saito | |
| 5,086,361 A | 2/1992 | Kawada et al. | |
| 5,113,298 A | 5/1992 | Fukushima et al. | |
| 5,265,084 A | 11/1993 | Ozue et al. | |
| 5,303,106 A | 4/1994 | Kiko | |
| 5,321,569 A | 6/1994 | Sakai | |
| 5,392,180 A | 2/1995 | Hasegawa | |
| 5,424,889 A | 6/1995 | Hasegawa | |
| 5,438,468 A | 8/1995 | Hasegawa et al. | |
| 5,448,439 A | 9/1995 | Magnusson et al. | |
| 5,459,625 A | 10/1995 | Ohshima et al. | |
| 5,528,438 A | 6/1996 | Tanaka et al. | |
| 5,761,788 A * | 6/1998 | Hirota et al. | 29/527.1 |
| 6,081,403 A | 6/2000 | Uetake et al. | |
| 6,515,833 B1 | 2/2003 | Shirai et al. | |

OTHER PUBLICATIONS

"Sony Digital Videocassette Recorder, DVW-A500/500 Maintenance Manua" 1 Part 1, 1st Edition (Revised 3), Section 1, 2, 7, and 8.

* cited by examiner

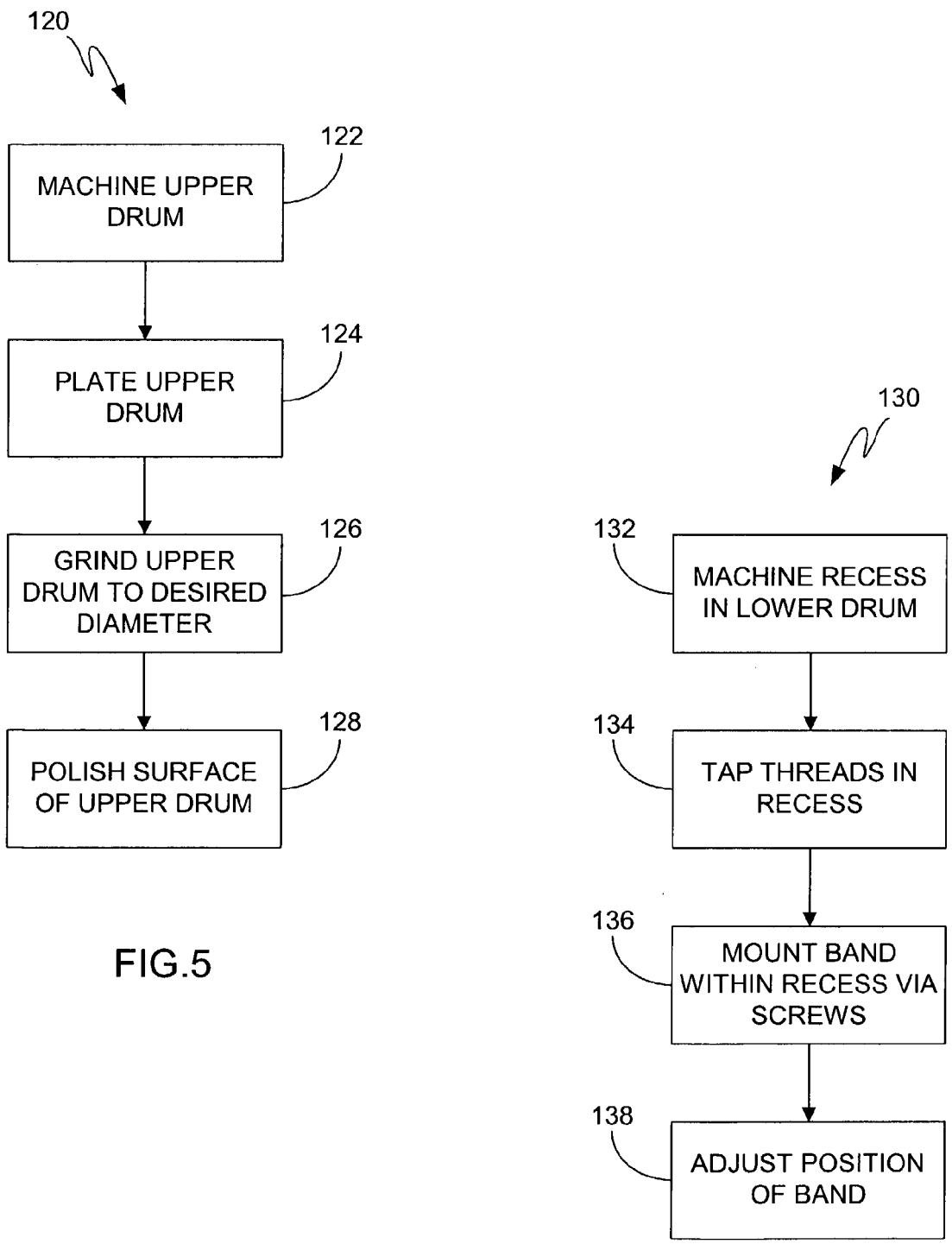

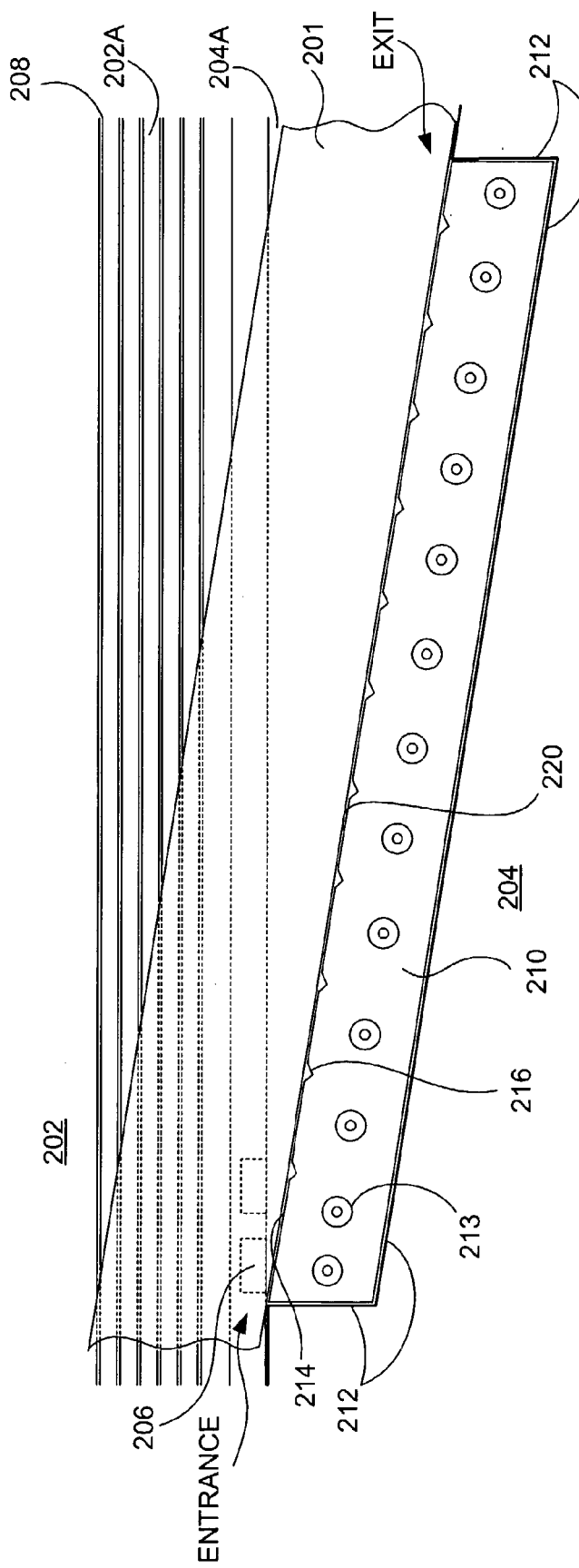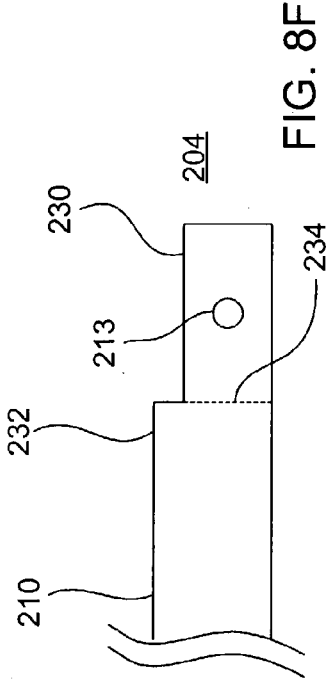
FIG. 8E
FIG. 8F

METHOD OF MANUFACTURING A DRUM ASSEMBLY ASSOCIATED WITH VIDEO TAPE MACHINE

BACKGROUND OF THE INVENTION

The present invention relates to video tape machines. More particularly, the present invention relates to improved techniques for manufacturing and/or refurbishing a drum assembly that is used in a video tape machine.

Videotape machines that employ drum assemblies including rotating record/reproduce heads are well known. In such machines, a recording medium in the form of tape is wrapped around the drum assembly so that rotating record/reproduce heads can record and reproduce. In general, the heads rotate while the tape is moved (or held stationary) around the drum assembly. The heads may include video heads, audio heads and control track heads and in cases where video editing is needed may also include time code heads, audio confidence playback heads, audio-only erase heads, flying erase heads, etc. The drum assembly generally cooperates with loading mechanisms, reel hubs, tape guides, sensors, erase head, capstans to form a mechanical transport assembly that provides the mechanical interface between the video tape machine electronics and the information recorded on the tape.

Videotape machines can be categorized using several criteria, including tape width (ranging from ¼ in up to 2 in), style (open reel and cassette), scanning method (transverse and helical scan) and recording format (e.g., U-Matic, B, C, Betacam, Digital Betacam, DV, etc.). Most commercially successful videotape machines are based on helical scanning methods. In helical scans, a slow moving tape is helically wrapped 180 degrees around the drum assembly that houses the rotating record/reproduce heads. The tape is positioned at a slight angle to the equatorial plane of the rotating record/reproduce heads. As such, the recorded tracks run diagonally across the tape from one edge to the other. Recorded tracks are parallel to each other but are at an angle to the edge of the tape. There are many recording formats that use helical scanning methods. In the C recording format (analog), the videotape machines use 1 inch oxide tape in open reels. In Digital Betacam recording format (digital), the video tape machines use ½ inch metal tape in cassettes. Digital Betacam is generally preferred over C recording formats because of its digital nature and the fact that it can be used for High Definition.

FIG. 1A illustrates a video tape machine 2 that includes a mechanical transport system 3 that is enclosed by a housing 4. By way of example, the video tape machine may correspond to a Digital Betacam editing recorder such as the DVW, DNW, HDW models manufactured by Sony of Japan. FIG. 1B illustrates the mechanical transport system 3 with a loaded cassette 5. By way of example, the mechanical transport system 3 may correspond to the mechanical transport system used in the DVW-500A model Digital Betacam editing recorder manufactured by Sony of Japan.

As shown in FIG. 1B, the mechanical transport system 3 includes a tape running system 6 having various components 11 including guides, capstan, pinch roller, tape cleaner and the like. The mechanical transport system 3 also includes stationary heads 8 and rotary heads 9 that are disposed in a drum assembly 10. The tape running system 6 is configured to direct a tape 7 around the drum assembly 10 so that the tape 7 engages the rotary heads 9 for recording and reproducing on the tape 7. As shown, the tape running system 6 includes at least an entrance guide 12A for introducing the tape 7 to the drum assembly 10 and an exit guide 12B for removing the tape 7 from the drum assembly 10. As should be appreciated, while the tape 7 is moved around the drum assembly 10 by the tape running system 6, the rotary heads 9 rotate at great speeds reading data from the tape 7 and writing data to the tape 7. Although not shown, the drum assembly is in a tilted position for helical scanning.

Referring to FIGS. 2A & 2B the drum assembly 10 will be described in greater detail. FIG. 2A is a perspective view of the drum assembly 10, and FIG. 2B is a side elevation view, in cross section, of the drum assembly 10. As shown, the drum assembly 10 includes an upper drum 12, an inner drum or scanner 14, a lower drum 16, a drum support 18, a spindle assembly 20, an upper base 22 and a lower base 24. The inner drum 14, which is disposed inside an opening 26 formed in the upper drum 12, is attached to the spindle assembly 20. The inner drum 14, among other things, includes a plurality of record/reproduce heads 9 configured for video recording. The record/reproduce heads 9 are disposed in a gap formed between the upper and lower drums 12 and 16. As should be appreciated, the record/reproduce heads 9 are rotated via the spindle assembly 20 to accomplish any recording or reproducing tasks. The inner drum 14 also includes a cavity 32 for allowing a slip ring assembly (not shown) to be positioned therein. Slip ring assemblies carry electrical signals between the rotating heads and other equipment with which the rotating head has relative motion. By way of example, representative slip ring assemblies may be found in co-pending patent application Ser. No. 09/721,436, which is titled "Slip Ring Assembly For Use In a Video Recorder" and filed on Nov. 22, 2000, and which is herein incorporated by reference.

The lower base 24 is structurally coupled to the upper base 22 and the upper base 22 is structurally coupled to the lower drum 16. The drum support 18 is configured to hold or support the upper drum 12 relative to the lower drum 16. As should be appreciated, the tape moves over the outer peripheral surfaces 12A and 16A of the stationary upper and lower drums 12 and 16 while the rotary heads 9 rotate in order to record or reproduce. The lower drum 16 includes a shoulder 28 for supporting the tape and guiding the tape along the outer peripheral surfaces 12A and 16A of the upper and lower drums 12 and 16 adjacent the rotary recording/reproducing heads 9. As shown in FIG. 3A, the shoulder 28 is angled about the periphery of the lower drum 16 because of the helical scanning method used in the videotape machine (e.g., enters at high point and exits at low point). The shoulder 28 is also radially tapered so as force the tape towards the surfaces 12A and 16A of the upper and lower drums 12 and 16 thereby providing better contact with the heads 9. In some cases, sticktion may be encountered when the tape is moved across the upper drum 12. In order to reduce the sticktion, the upper drum 12 includes a pair of bumps 30 that extend past the outer peripheral surface 12A of the upper drum 12 as shown in FIG. 3B. The bumps 30 provide an air gap between the top edge of the backside of the tape 7 and the outer peripheral surface 12A of the upper drum 12 (the air gap helps to reduce sticktion between the tape and the upper drum).

Referring back to FIGS. 2A and 2B, the spindle assembly 20 includes a spindle 46 and a spindle pad 48. The spindle 46 is rotatably coupled to the upper base 22 via a set of bearings 52 and powered by a motor (not shown) housed within the lower base 24. The motor is typically configured to rotate the spindle 46 along an axis 54 at speeds up to 10,000 revolutions per minute (rpm). One end of the spindle pad 48 is attached to the spindle 46 while the opposite end is attached to the inner drum 14. The spindle pad 48 includes a guide post 33 and a mounting flange 50. As shown, the guide post 33 extends into a portion of the cavity 32, and the mounting flange 50 provides a mounting surface for securing the inner drum 14 thereto. Furthermore, the guide post 33 includes a guide hole 34 configured for supporting a slip ring assembly (not shown).

Unfortunately, the design and implementation of the drum assembly 10 leads to problems which may shorten part life and the proper functioning of the video tape machine in which it is used. For example, one problem associated with the above assembly is that the upper and lower drums 12 and 16 include polished aluminum outer peripheral surfaces 12A and 16A. The polished aluminum outer peripheral surfaces 12A and 16A, which contacts the tape 7, is not very effective at preventing sticktion problems, and it is soft material that is suceptable to wear. Referring to FIG. 3A, the shoulder 28 that guides the tape 7 around the drum assembly 10 may wear as the tape 7 is moved across its surface. The wear can lower the position of the shoulder 28 thus shifting the position of the tape 7 relative to the heads 9. This may make it difficult for the heads 9 to record or reproduce. The contact between the tape 7 and the outer peripheral surfaces 12A and 16A can also produce undesirable particles 60 (from both the shoulder and the tape). These particles may adhere to the backside or data side of the tape 7 thus causing signal dropout problems. The particles 60 may also build up on the shoulder 28 possibly shifting the position of the tape 7 relative to the heads 9 (e.g., pushing the tape away from the surface) or making it more difficult for the tape 7 to move along the shoulder 28. The taper in the shoulder 28 may further trap particles 60 on the shoulder 28, i.e., no place for the particles to go. All of these problems may make it difficult for the heads 9 to record or reproduce. Another problem associated with the drum assembly is that the drums are cold plated (e.g., chemical process that occurs at the molecular level) to help protect the surfaces of the drum. The cold plating process, however, distorts the shape of the drum. For example, the upper drum may be distorted into an egg shape (e.g., the diameter is not uniform). As should be appreciated, distortions such as these may make it difficult for the heads 9 to record or reproduce. Another problem associated with the drum assembly 10 is that the bumps 30 (as shown in FIG. 3B) tends to cause tape wear as for example shedding that produces undesirable particles 60. It may also make it difficult for the heads 9 to record or reproduce since its only located at the top edge of the tape 7 (e.g., produces a deformed signal such as spikes).

In view of the foregoing, there are desired improved methods and apparatuses for manufacturing and/or refurbishing a drum assembly used in a video tape machine such as the DVW, DNW, HDW models manufactured by Sony of Japan.

SUMMARY OF THE INVENTION

The invention relates, in one embodiment, to a method of manufacturing a drum assembly associated with a digital betacam video tape machine. The method includes providing a helical scan drum assembly having a stationary upper drum, a stationary lower drum and a plurality of rotating read/write heads disposed between the stationary upper and lower drums. The rotating read/write heads reading and writing digital information to and from a tape. The method further includes inserting air grooves in the outer peripheral surface of the upper drum. The air grooves are configured to reduce sticktion between the tape and the outer peripheral surface of the upper drum when the tape is moved around the outer peripheral surface of the upper drum. The method additional includes mounting an adjustable band to the outer peripheral surface of the lower drum. The adjustable band is configured to guide the tape around the drum assembly in accordance with helical scans when the tape is moved around the outer peripheral surface of the upper drum.

The invention relates, in another embodiment, to a drum assembly associated with a digital betacam video tape machine. The drum assembly includes an upper drum having an outer peripheral surface for receiving a tape. The outer peripheral surface of the upper drum is plated with nickel, and includes one or more air grooves disposed circumferentially therearound. The drum assembly also includes a lower drum having an outer peripheral surface for receiving the tape and an adjustable band for guiding the tape around the drum assembly. The adjustable band is mounted within a recess formed in the outer peripheral surface of the lower drum.

The invention relates, in another embodiment, to a method of refurbishing a drum assembly associated with a DVW, DNW or HDW Digital Betacam editing recorder. The method includes providing an upper drum of the drum assembly. The method also includes undersizing the diameter of the upper drum. The method further includes inserting grooves in the outer peripheral surface of the upper drum. The method additionally includes oversizing the undersized diameter of the upper drum with a wear resistant material. Moreover, the method includes reducing the oversized diameter of the upper drum so that the diameter of the upper drum is within specified limitations.

The invention relates, in another embodiment, to a method of refurbishing a drum assembly associated with a DVW, DNW or HDW Digital Betacam editing recorder. The method includes providing a lower drum of the drum assembly. The lower drum includes a shoulder for guiding a tape around the drum assembly. The method also includes removing the shoulder from the lower drum. The method further includes inserting a recess within the outer peripheral surface of the lower drum. The method additionally includes mounting an adjustable band within the recess. Moreover, the method includes adjusting the position of the band relative to one or more heads of the drum assembly.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is an upper drum manufacturing method, in accordance with one embodiment of the present invention.

FIG. 6 is a lower drum manufacturing method, in accordance with one embodiment of the present invention.

FIG. 8E is a front elevation view of a drum assembly, in accordance with one embodiment of the present invention.

FIG. 8F is a broken away diagram of an adjustable band, in accordance with one embodiment of the present invention.

DETAILED DESCRIPTION OF THE INVENTION

Embodiments of the invention are discussed below with reference to FIGS. 4-8. However, those skilled in the art will readily appreciate that the detailed description given herein with respect to these figures is for explanatory purposes as the invention extends beyond these limited embodiments.

Figure 3A:
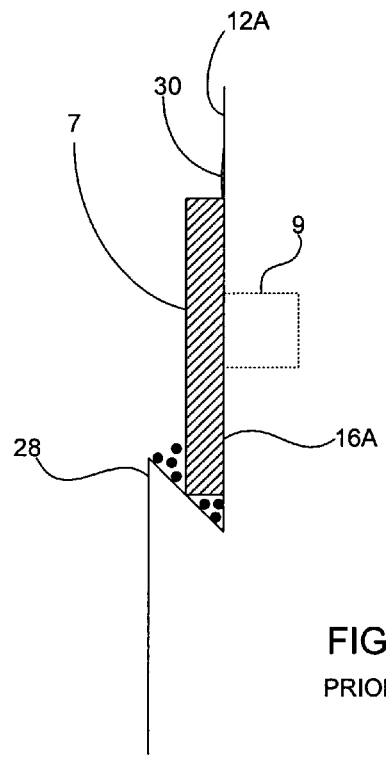
FIG. 3A is a broken away side elevation view, in cross section, showing the shoulder of the drum assembly.
Figure 3B:
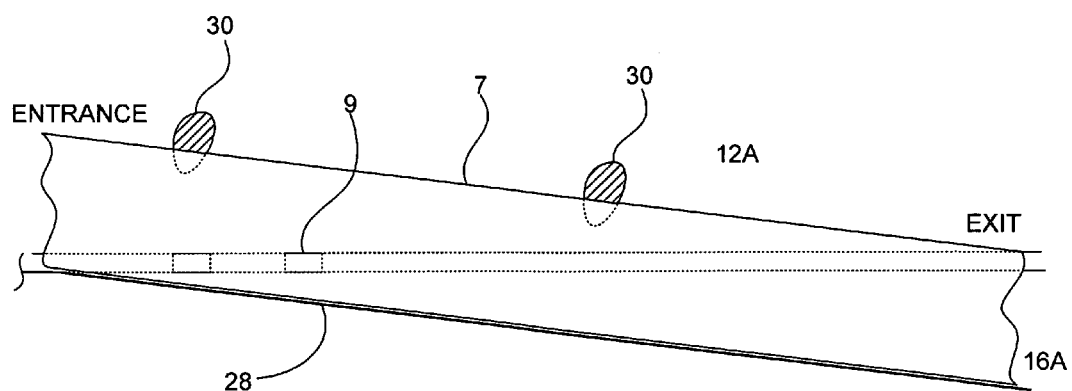
FIG. 3B is a front elevation view showing the shoulder of the drum assembly.
Figure 4:
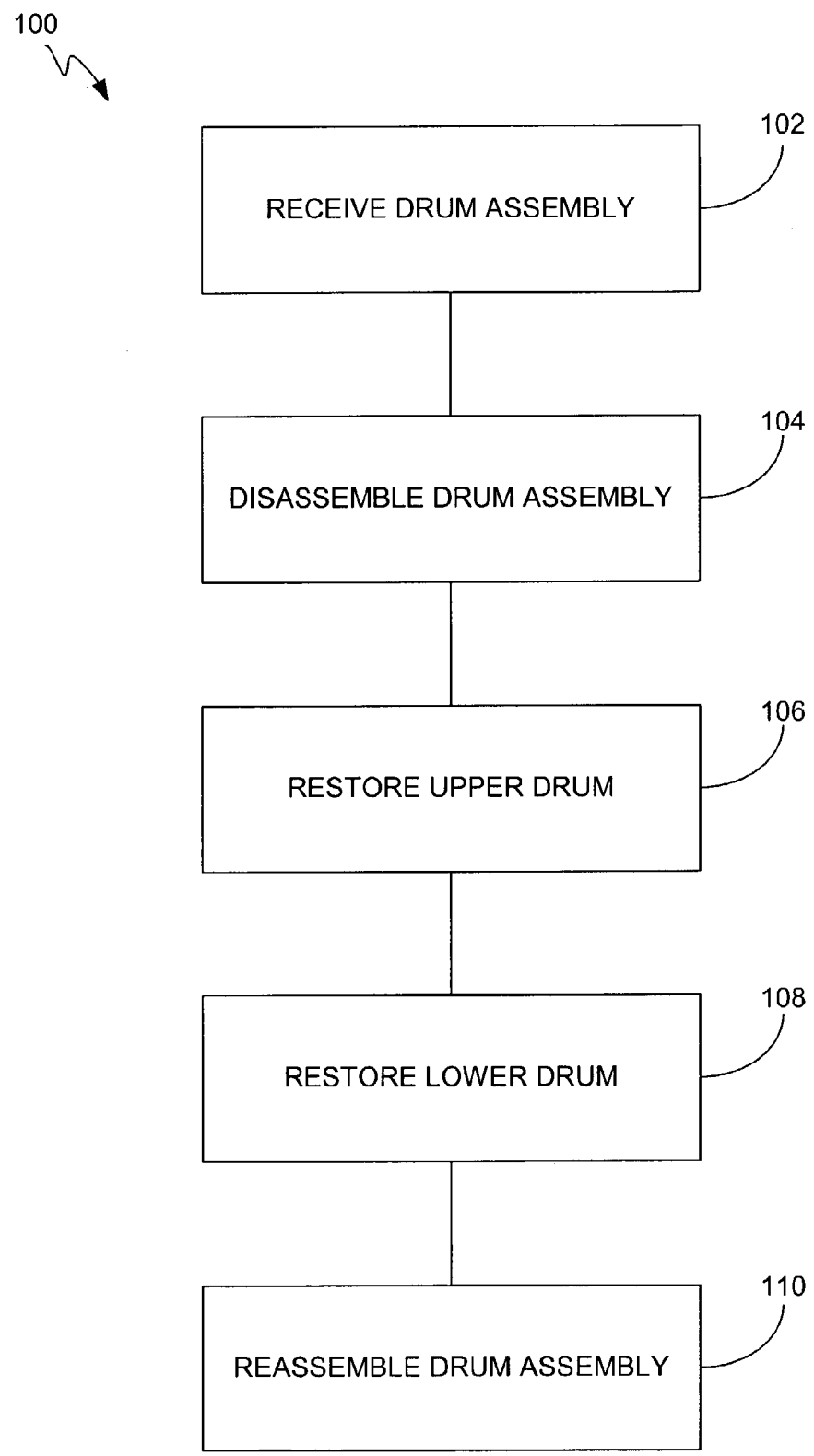
FIG. 4 is a method for manufacturing a drum assembly, in accordance with one embodiment of the present invention.

FIG. 4 is a method 100 for manufacturing an improved drum assembly, in accordance with one embodiment of the present invention. I one particular embodiment, the drum assembly corresponds to the drum assembly shown in FIGS. 2 and 3. The method 100 generally begins at block 102 where a drum assembly is received. The drum assembly may be a new or used drum assembly, although in most cases, the drum assembly is a used drum assembly. By used, it is meant that the drum assembly has been used in a video tape machine in order to read and write data to and from a tape. In most cases, used drum assemblies have detoriated to the point where the signals being generated therefrom have degraded to an unacceptable level.

Following block 102, the process flow proceeds to block 104 where the drum assembly is disassembled. This is generally accomplished using standard or conventional disassembly procedures. During the disassembly, the upper drum and lower drum are removed so that they are separate and distinct components. Once separated, the process flow proceeds to blocks 106 and 108 where the upper drum and lower drums are repaired, restored or refurbished. The repair, restoration or refurbish techniques are typically implemented to improve the performance of the drum assembly and thus the video tape machine in which it will be used (e.g., produce a better signal, reduce wear, increase life, etc.). Repairing, restoration and refurbishing may include machining, plating, grinding, polishing and the like. In one embodiment, the surface of a drum is coated with a material that reduces sticktion and reduces wear. Repairing, restoration and refurbishing may also include adding or removing components of the drum assembly to further enhance the performance of the drum assembly. For example, the air bumps may be replaced with air grooves, and the shoulder may be replaced with an adjustable band. The air grooves, which are machined into at least the upper drum, are configured to reduce sticktion problems associated with the tape riding along the outer peripheral surface of the upper drum without inducing shedding problems. The adjustable band, on the other hand, allows an operator to adjust the tape position relative to the heads so that the drum assembly produces a better signal than would have otherwise been achieved with a permanent shoulder. By way of example, the adjustable band may allow an operator to adjust the RF signal to within 5% to 10% of optimal. As should be appreciated, the fixed shoulder generally produces a signal within 20% of optimal.

Once the upper and lower drums have been repaired, restored or refurbished, the process flow proceeds to block 110 where the drum assembly is reassembled. This is generally accomplished using standard and conventional procedures. Although not discussed herein, other repairing, restoring and refurbishing steps may be performed between disassembly and reassembly of the drum assembly. For example, the heads in the inner drum may be replaced, repaired, restored, refurbished, or the like.

FIG. 5 is an upper drum improvement method 120, in accordance with one embodiment of the present invention. By way of example, the method may be used in conjunction with repairing, restoration or refurbishing block 106 described in FIG. 1. The method 120 generally begins at block 122 where the upper drum is machined. Two machining steps are generally performed. A first machining step is performed to remove a portion of the outer peripheral surface of the upper drum (e.g., undersizing) and to form a more cylindrical upper drum (e.g., place diameter within desired TIR). The upper drum is generally radially undersized between about 0.001 in. and about 0.003 in., and more particularly about 0.002 in. In most cases, the TIR (total indicator run out) is about 0.0005.

A second machining step is performed to add air grooves along the outer peripheral surface of the upper drum. The air grooves are configured to reduce sticktion associated with tape traveling around the outer peripheral surface of the upper drum. In particular, the air grooves provide an air passage that prevents vacuum related sticktion problems that would have normally occurred if such grooves were not there. The air grooves are generally machined circumferentially around the entire upper drum. It should be noted, however, that this is not a limitation and that the air grooves may only be machined in the area where the tape contacts the outer peripheral surface of the upper drum (e.g., proximate the entrance location).

Any number of air grooves may be used. For example, one to about 8 air grooves may be used. In one embodiment, four air grooves are used. In another embodiment, six air grooves are used. The number of air grooves is generally dependent on the dimensions of the air grooves. As should be appreciated, the dimensions of the air grooves may be widely varied. For example, the depth may range from about 0.001 in. to about 0.020 in., and more particularly about 0.010 in. Furthermore, the height may range from about 0.001 in. to about 0.020 in. and more particularly about 0.010 in. In addition, the spacing between air grooves may range between about 0.025 in. and about 0.100 in., and more particularly about 0.050 in. The position of the air grooves may also be widely varied. For example, the first air groove may be spaced between about 0.100 in. and about 0.300 in. from the top of the rotating heads. While not wishing to be bound by theory, it is generally believed that placing the air groove to close to the heads may adversely effect the functioning of the heads. Furthermore, the highest air groove is preferably placed at a location proximate the highest contact point between the tape and the outer peripheral surface of the upper drum.

Following block 122, the process flow proceeds to block 124 where the upper drum is plated with a material other than the material (e.g., aluminum) of the upper drum. The material is preferably selected to improve the hardness of the surface of the upper drum thus reducing wear and increasing the life of the upper drum. The material is also selected to reduce sticktion between the tape and the outer peripheral surface of the upper drum (e.g., allows the tape to more freely move therearound). The plating process and material are also selected to produce a non magnetic surface. As should be appreciated, magnetic surfaces can adversely effect recording and reproducing. In one embodiment, the upper drum is electroplated with non magnetic electroless Nickel. Nickel produces a Rockwell hardness greater than aluminum thereby preventing wear to a greater degree. By way of example, the Rockwell hardness of Nickel may be about 40 to about 60 Rc. Nickel also produces a better finish than aluminum thereby reducing sticktion. In addition and while not wishing to be bound by theory, Nickel has microscopic air pockets that are believed to help reduce sticktion. The plating process is also configured to add enough material to the upper drum so that it is oversized (e.g., outside the desired tolerances for the diameter). The amount of oversize may be widely varied, however, it is generally radially oversized between about 0.002 in. and about 0.004 in. In one particular embodiment, the upper drum is plated in accordance with C-26074E class Mill Spec. Although plating and nickel is preferred, it should be noted that other processes and materials may also be used. For example, hard anodizing may be used.

Following block 124, the process flow proceeds to block 126 where the outer peripheral surface of the upper drum is ground to the desired diameter (e.g., remove a portion of the oversize). The grinding process is performed to place the diameter of the upper drum within desired tolerances. In one embodiment, the finished diameter of the upper drum is ground to about 3.2060±0.0002 in. The grinding process may be widely varied. For example, it may be tool post lathe grinding or it may be cylindrical grinding. Furthermore, it may be a wet or dry grinding process.

Following block 126, the process flow proceeds to block 128 where the outer peripheral surface of the upper drum is polished. For example, the upper drum is spun at some predetermined rpm and the upper drum is polished back and forth longitudinally (e.g., similar to buffing). As should be appreciated, the nickel plated upper drum produces a better finish than the previous aluminum upper drum. In one embodiment, the polishing produces a high polish. While not wishing to be bound by theory, it is generally believed that the greater the polish, the greater the reduction in sticktion.

The above mentioned method has been found to work well on drum assemblies that use ½ inch metal tape such as that used in video tape machines DVW, DNW, HDW models manufactured by Sony of Japan, and more particularly, the model DVW-A500.

FIG. 6 is a lower drum improvement method 130, in accordance with one embodiment of the present invention. By way of example, the method may be used in conjunction with repairing, restoring or refurbishing block 108 described in FIG. 1. The method 130 generally begins at block 132 where a recess in the lower drum is machined. The recess is formed in the shoulder of the lower drum. The recess follows the path of the shoulder between the entrance and exit area of the lower drum. The recess may be machined to a depth placing its surface flush with the tape contact surface of the lower drum or it may be machined to a depth greater than flush (e.g., radially inward of the tape contact surface). The recess is configured to receive an adjustable band that acts like the shoulder. Unlike the shoulder, however, the position of the adjustable band may be changed thus providing the operator with a greater ability to effect the position of the tape relative to the heads. As a result, a better signal may be produced. In one embodiment, the band includes a plurality of cutouts spaced about the length of the band for dispensing particulate formed during use of the drum assembly. The band may be formed from a variety of materials. The material chosen generally corresponds to materials that are wear resistant. By way of example materials such as steel and titanium may be used. In one embodiment, the band is formed from stainless steel. The band may be placed through a lapping process to improve the flatness of the band. The properties of the band may be further enhanced by placing the band through a nitrating or hard anodizing process.

Following block 132, the process flow proceeds block 134 where threads are tapped into the recess. The threads are configured for receiving screws. This is accomplished using standard and conventional tapping methods. Following block 134, the process flow proceeds to block 136 where the adjustable band is mounted within the recess via screws. That is, the screws are inserted through slots in the band and secured to the threads in the recess. The screws provide a force to secure the band within the recess (e.g., sandwich). The recess is generally dimensioned to receive the adjustable band while still providing some room for adjustments (e.g., play). Following block 136, the process flow proceeds to block 138 where the position of the band is adjusted. In most cases, the top edge of the band is adjusted to a level or height that produces the best signal when the tape is rotated around the drum assembly on the top edge of the band.

The above mentioned method has been found to work well on drum assemblies that use ½ inch metal tape such as that used in video tape machines DVW, DNW, HDW models manufactured by Sony of Japan, and more particularly, the model DVW-A500.

Figure 7:
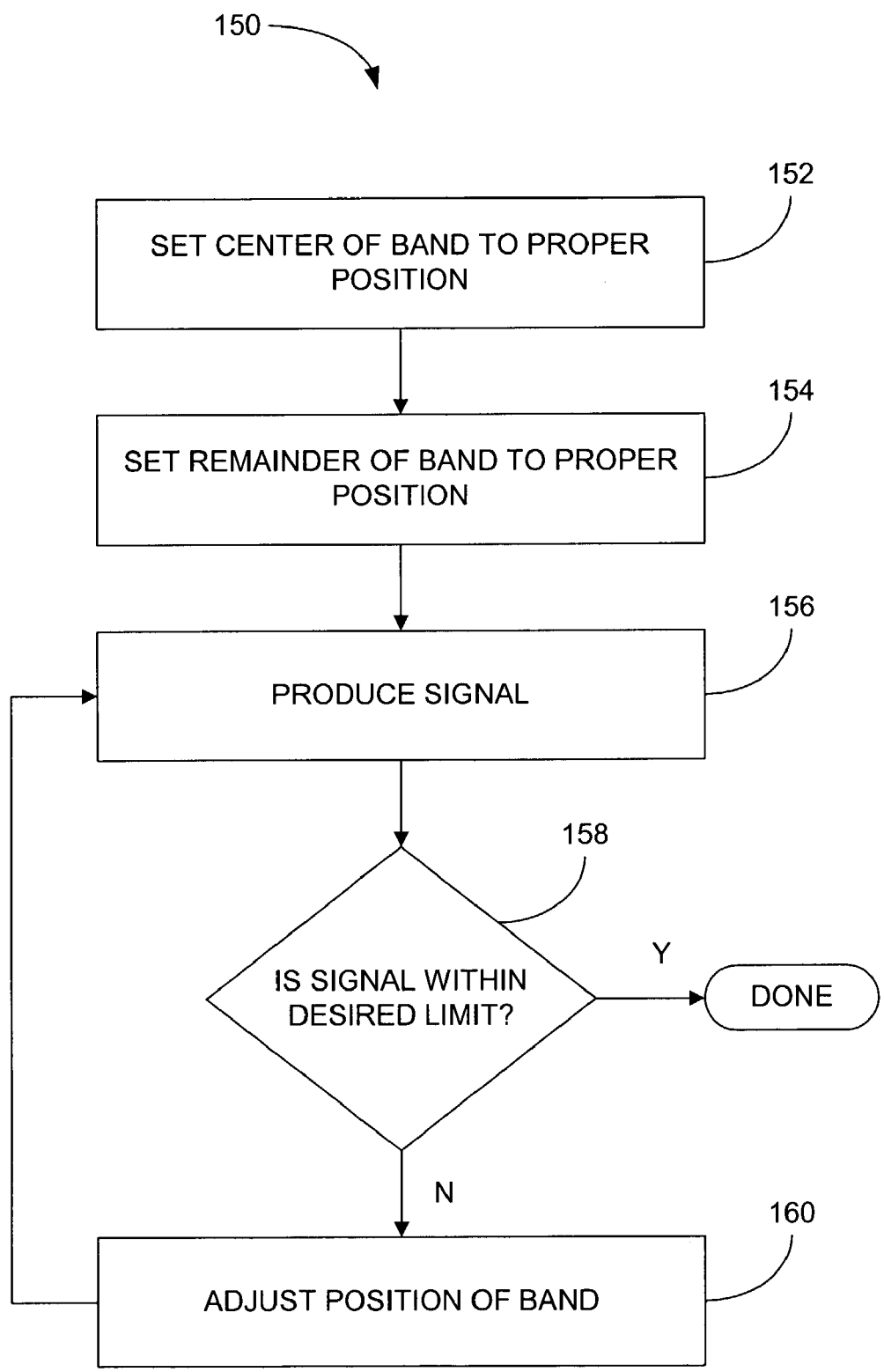
FIG. 7 is a band adjustment method, in accordance with one embodiment of the present invention.

FIG. 7 is a band adjustment method 150, in accordance with one embodiment of the present invention. By way of example, the method may generally correspond to block 138 in FIG. 3. Before the method begins, some pre-adjustment steps are typically taken. These pre adjustment steps generally include mounting the band to the lower drum. Although mounted, the screws are lightly tightened thereby allowing the band to move relative to the outer peripheral surface within the recess of the lower drum while being held thereto. The method 150 generally begins at block 152 where the center of the band is set to the proper position. This is generally accomplished with an indicator that measures the position of the band relative to the heads of the drum assembly. When positioned in the correct place, the center screw is tightened thus maintaining this position. In one embodiment, a specialized tool that secures to the inner drum of the drum assembly is used to measure the displacement between the heads and the top edge of the band. Because the tool is secured to the inner drum, it may rotate about the spindle axis 54 thus making it easy to measure each position.

Following block 152, the process flow proceeds to block 154 where the remainder of the band is set to the proper position. This is generally accomplished in a manner similar to the center band, i.e., using an indicator tool and tightening the screws. In most cases, the position of the band is set center to edge. That is, after the center is set, the next position outward in both directions is set and so on.

Following the setting steps, the process flow proceeds to block 156 where a signal is produced (e.g., RF signal). This is generally accomplished by running a tape around the drum assembly. After producing the signal, the process flow proceeds to block 158 where a determination is made to whether the signal is within a desired limit. If the signal is within desired limits, the process flow ends (e.g., the band position is set). If the signal is not within desired limits, then the process flow proceeds to block 160 where the position of the band is adjusted. For example, the edges may be adjusted, or the entire band may be adjusted. Once adjusted, the process flow proceeds back to block 156 where a signal is produced.

Figure 8A:
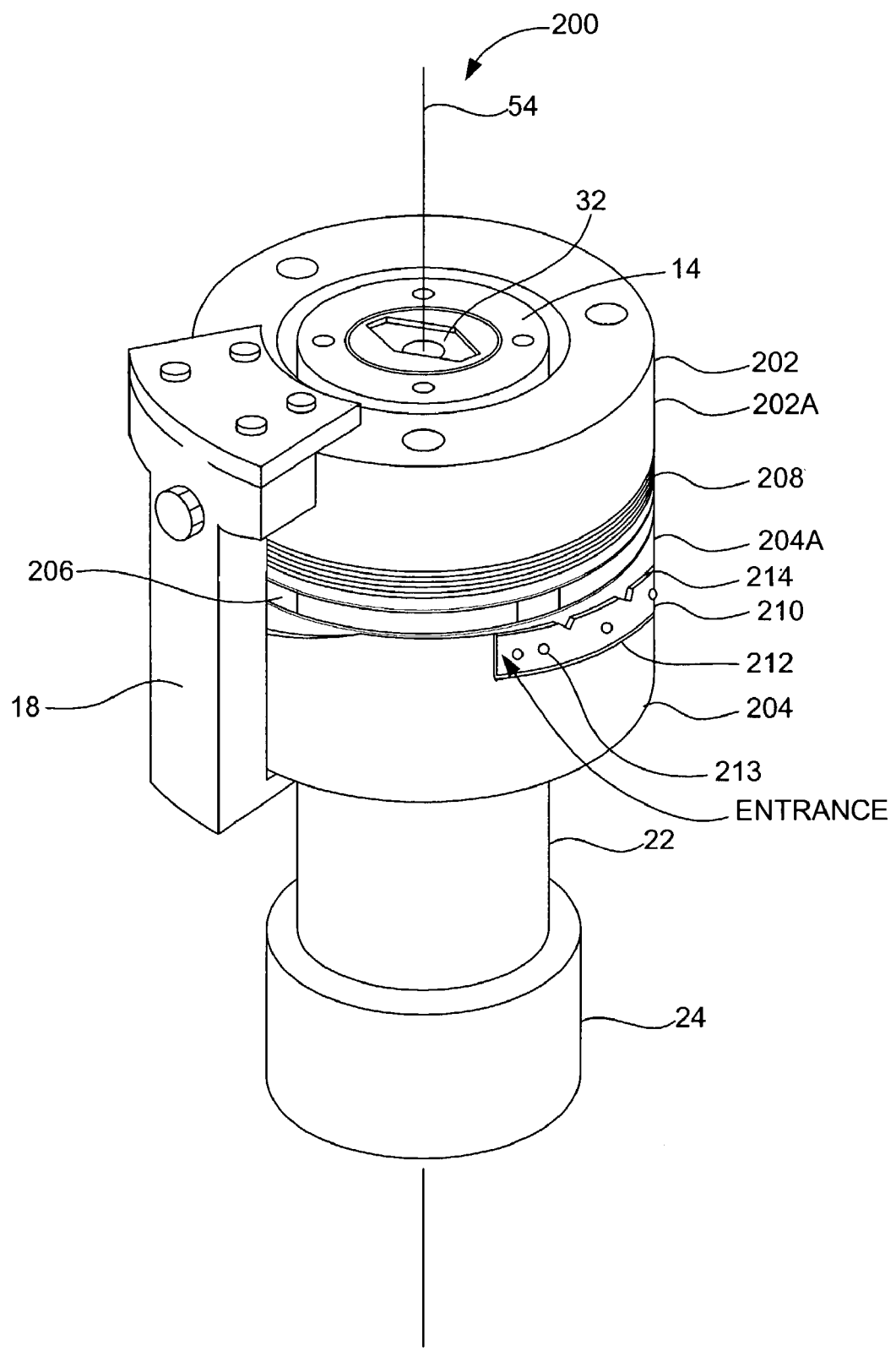
FIG. 8A is a perspective view of a drum assembly, in accordance with one embodiment of the present invention.
Figure 8B:
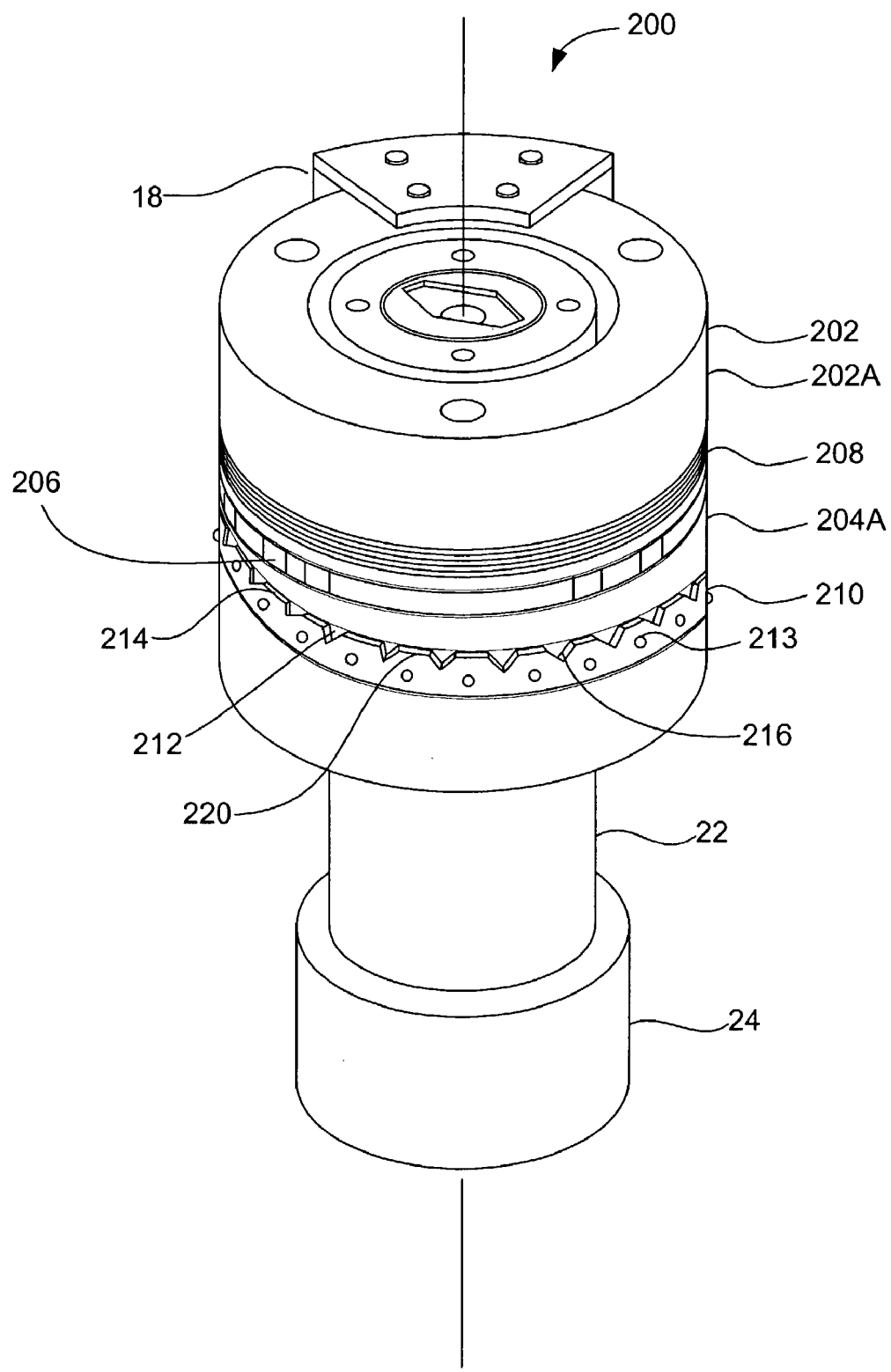
FIG. 8B is a perspective view of a drum assembly, in accordance with one embodiment of the present invention.
Figure 8C:
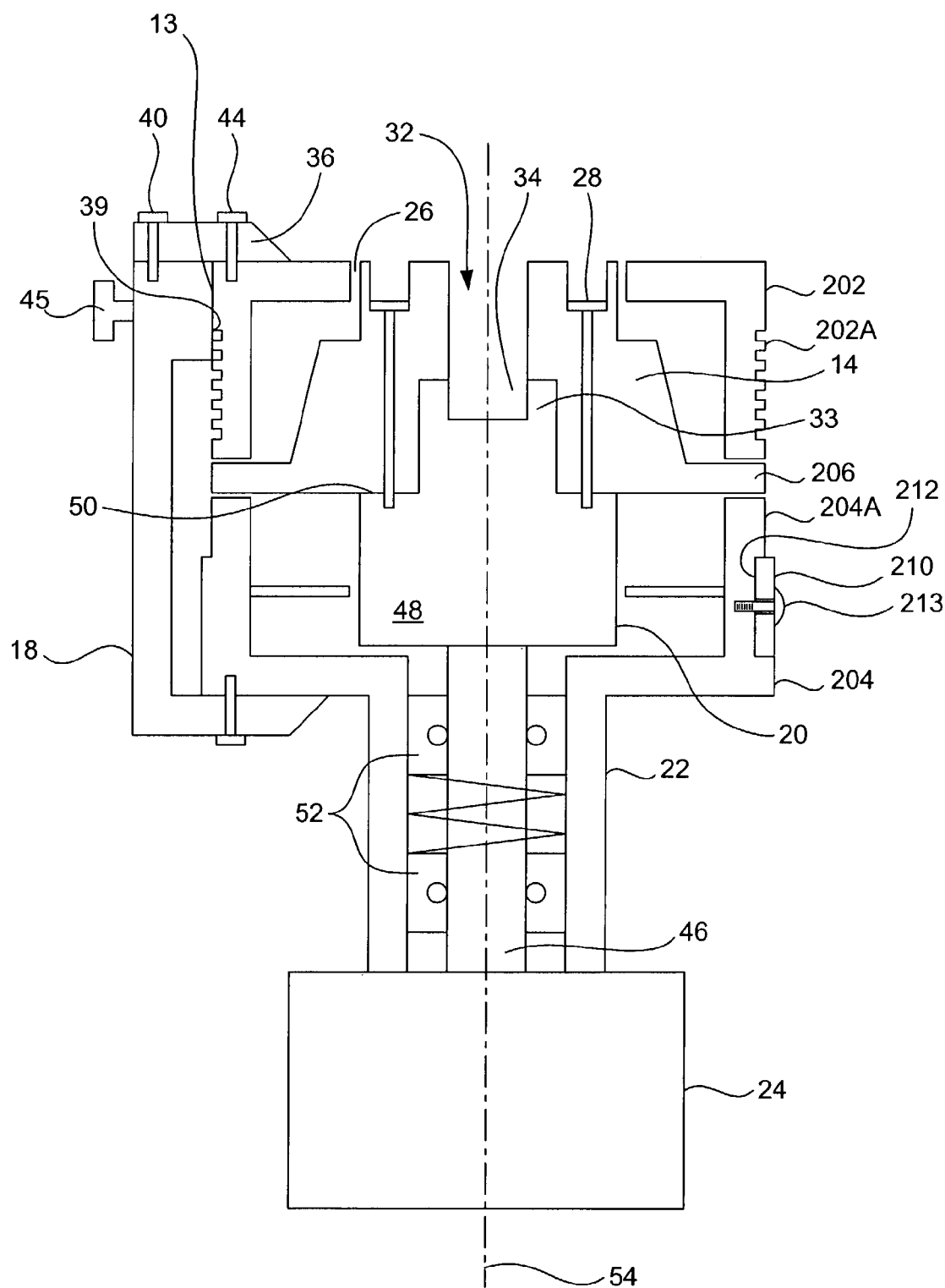
FIG. 8C is a side elevation view, in cross section, of a drum assembly, in accordance with one embodiment of the present invention.
Figure 8D:
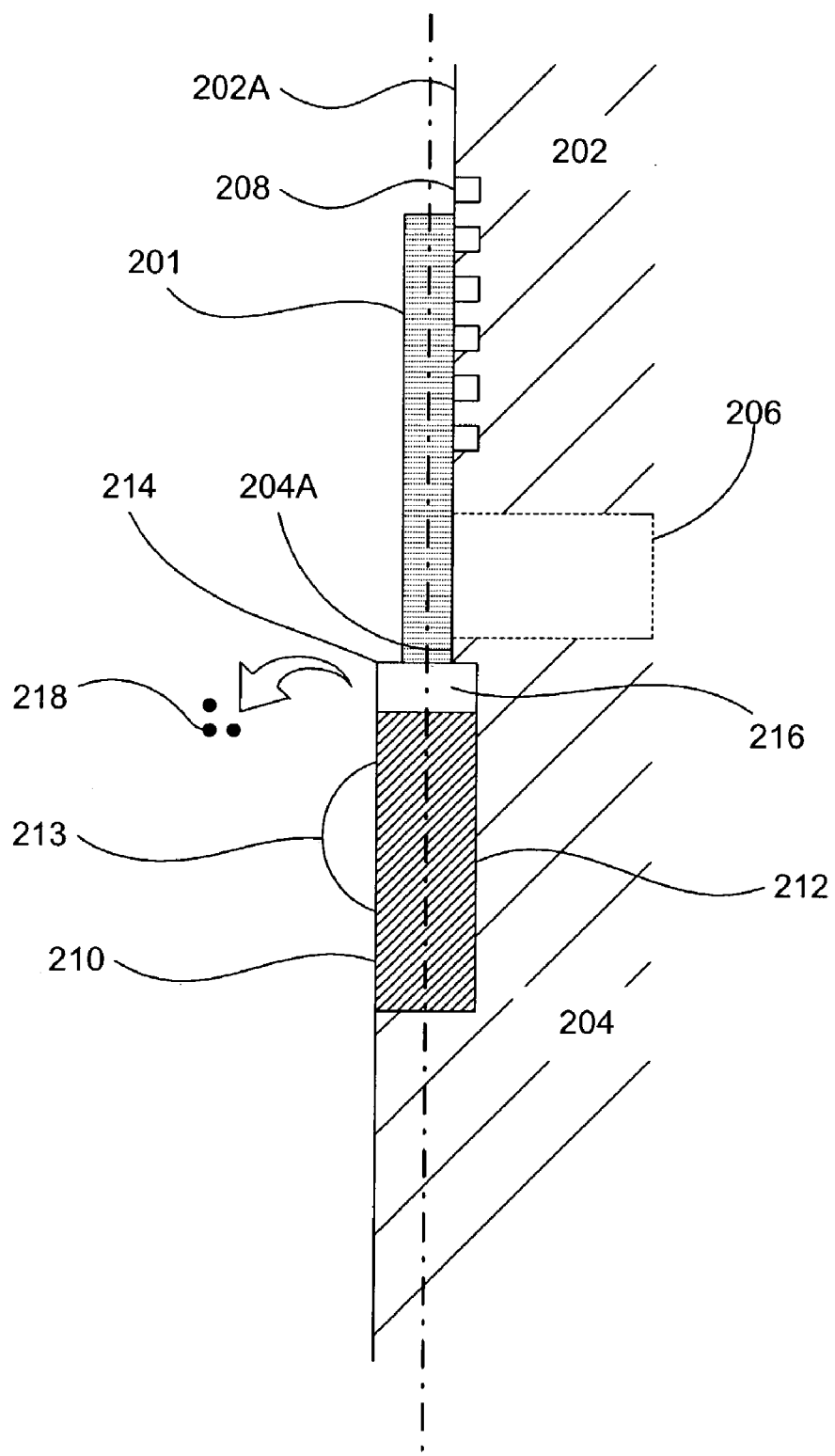
FIG. 8D is a broken away side elevation view, in cross section, of a drum assembly 200, in accordance with one embodiment of the present invention.

FIGS. 8A-8F illustrates an improved drum assembly 200, in accordance with one embodiment of the present invention. FIGS. 8A and 8B are perspective views of the drum assembly 200, FIG. 8C is a side elevation view, in cross section, of the drum assembly 200, FIG. 8D is a broken away side elevation view, in cross section, of the drum assembly 200, FIG. 8E is a front elevation view of the drum assembly 200, and FIG. 8F is a broken away front elevation view of the drum assembly 200. By way of example, the improved drum assembly may be improved using the above mentioned techniques on the drum assembly 10 shown in FIGS. 1-3. As shown, the drum assembly 200 includes an upper drum 202 and a lower drum 204. The upper and lower drums 202 and 204 provide a space therebetween for rotating heads 206. The upper drum 202 includes an outer peripheral surface 202A and the lower drum includes an outer peripheral surface 204A for receiving a tape 201 as it is rotated around the drum assembly 200. The outer peripheral surfaces 202A and 204A may be coated with a material to reduce sticktion and wear. In one embodiment, at least the outer peripheral surface 202A of the upper drum 202 is plated with Nickel. Nickel provides greater wear resistance and less sticktion than aluminum.

In order to further reduce sticktion, the upper drum 202 includes a plurality of spaced apart air grooves 208 located about the periphery of the upper drum 202 and recessed within the outer peripheral surface 202A. The air grooves 208 allow air to flow to the backside of the tape. The air grooves 208 are disposed above the rotating heads 206 and below the top edge of the upper drum 202. The number of air grooves may also be widely varied. For example, the number may range between about 1 and about 10 air grooves. In one particular embodiment, 6 air grooves are used. The dimensions and configuration including position of the air grooves generally depend on the number of air grooves used. The position of the air grooves 208 may be widely varied, however, the top air groove 208A is generally positioned proximate a point corresponding to where the top portion of the tape intersects the tape entrance of the drum assembly 200. The dimensions of the air groves 208 may be similar or different, although in most cases they are similar.

Figure 1A:
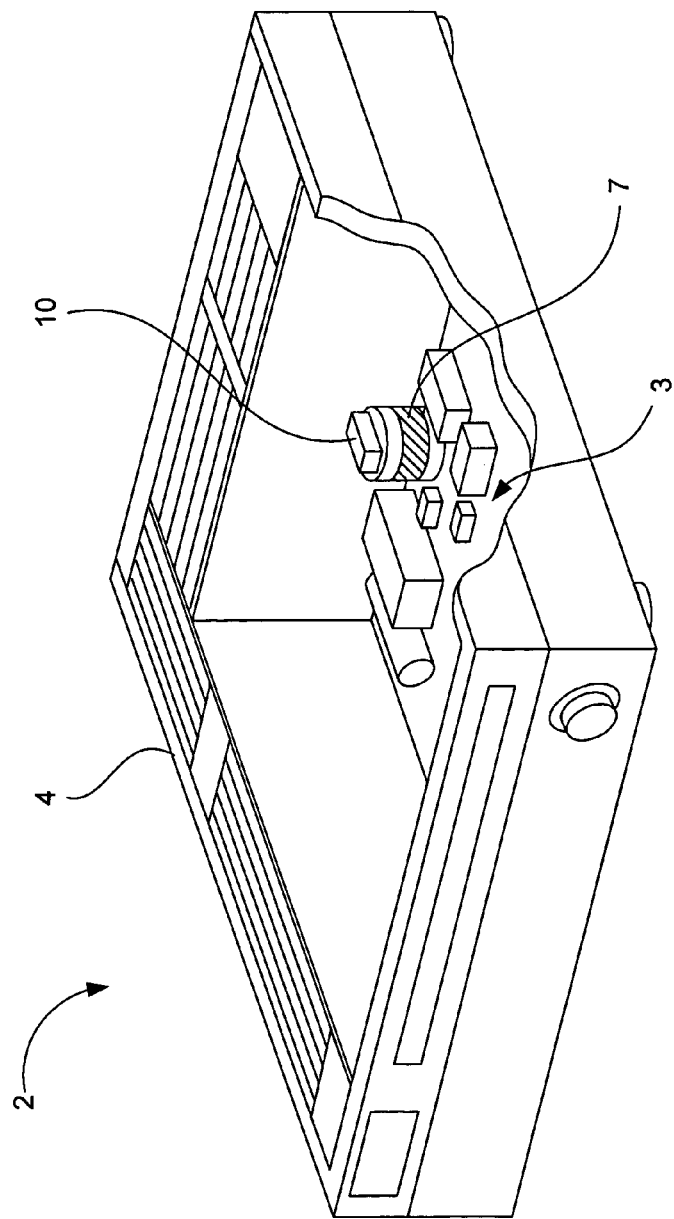
FIG. 1A is a broken away perspective diagram of a video tape machine.
Figure 1B:
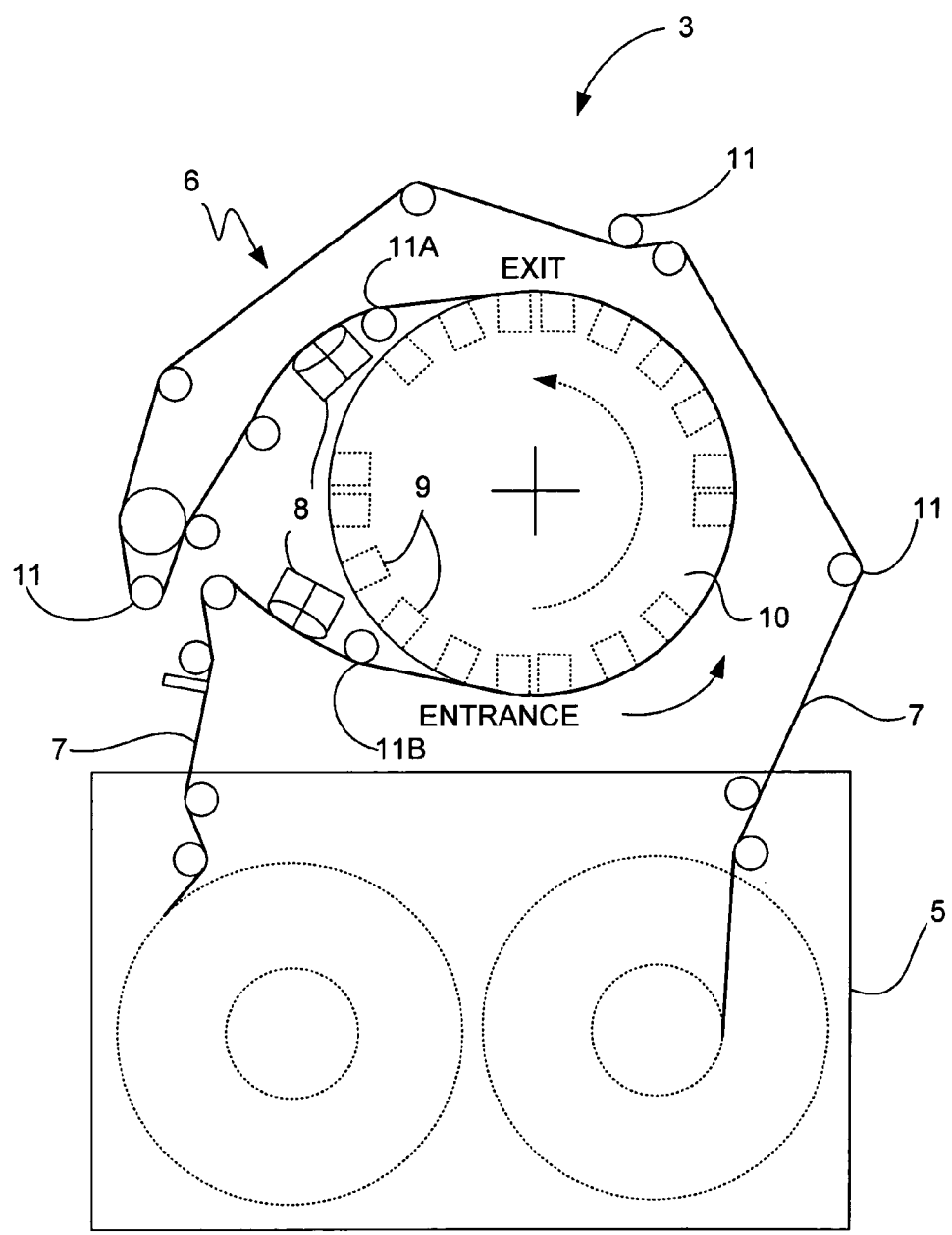
FIG. 1B is a top view of a mechanical transport system of the video tape machine.
Figure 2A:
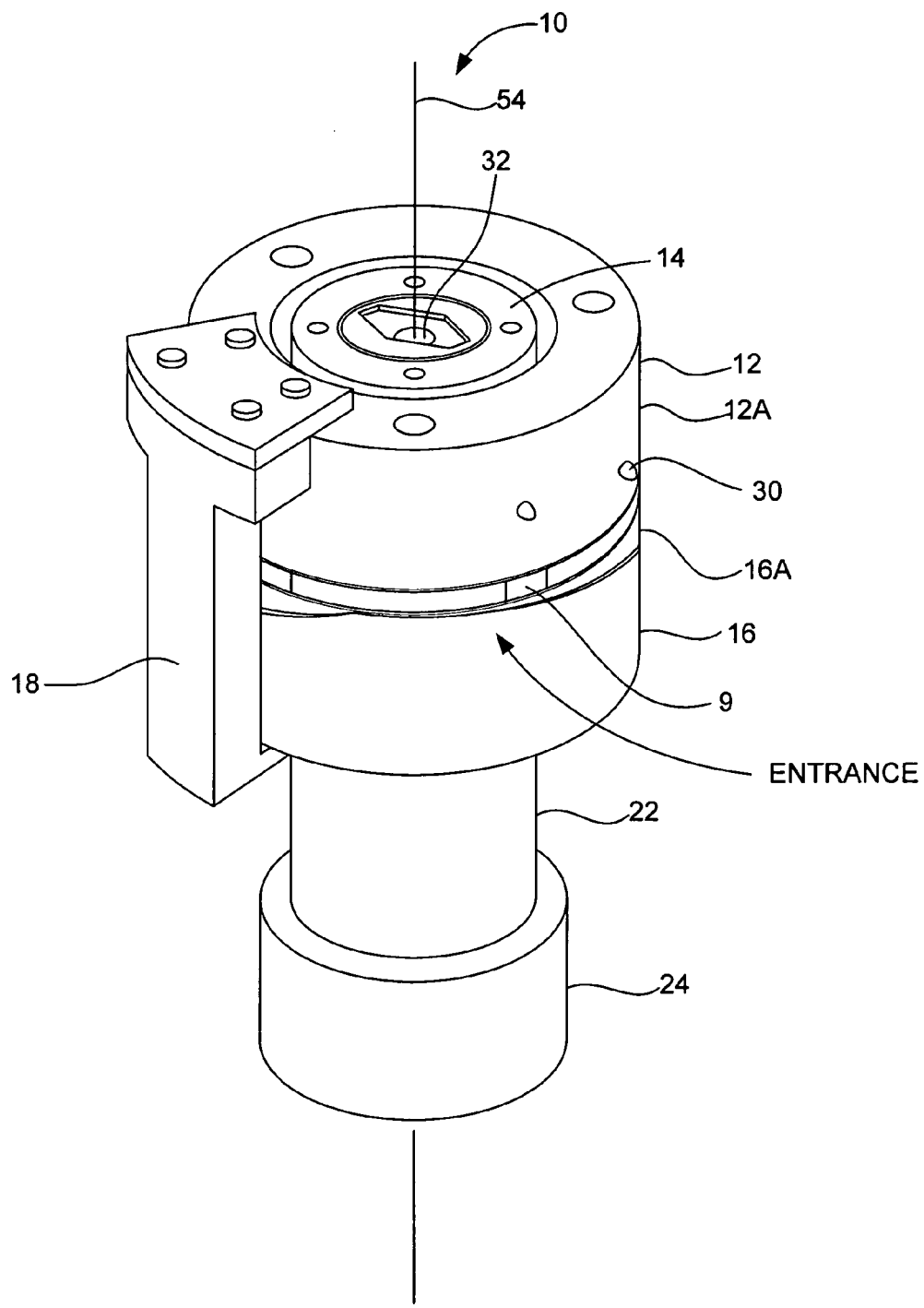
FIG. 2A is a perspective diagram of a drum assembly of the mechanical transport system.
Figure 2B:
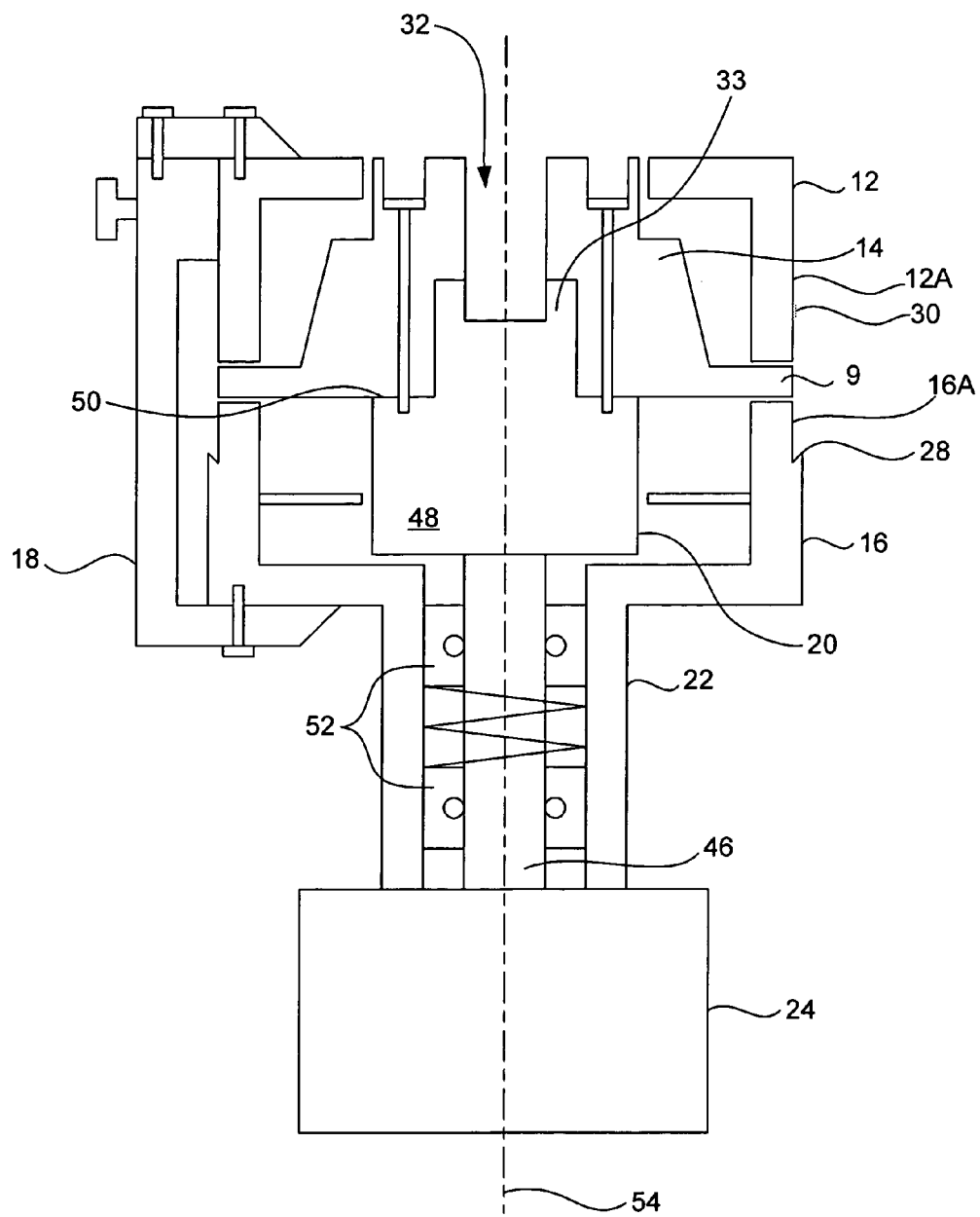
FIG. 2B is a side elevation view, in cross section, of the drum assembly.

In order to guide the tape around the drum assembly 200, the lower drum 204 includes an adjustable band 210 located partially around the lower drum 204 (e.g., from the entrance to the exit). The adjustable band 210 is secured within a recess 212 formed in the lower drum 204 via a plurality of screws 213. The recess 212 generally has a shape that coincides with the shape of the band 210. Referring to FIGS. 1-3, the recess 212 may be formed in a portion of the drum assembly 10 normally dedicated to the shoulder 28 as for example in a portion of the peripheral surface 16A. The top edge 214 of the adjustable band 210 is configured to receive the bottom edge of the tape as its moved around the drum assembly 200. Thus it is generally positioned proximate the location of the top edge of the shoulder of the drum assembly shown in FIGS. 1-3. As should be appreciated, the position of the top edge 214 relative to the heads generally determines the quality of the signal produced by the drum assembly 200. In order to improve the signal quality, the top edge 214 may be adjusted by loosening at least a portion of the screws 213 and moving the top edge to the appropriate height and thereafter tightening the loosened screws. In most cases, only the outer edges of the band near the entrance and exit have to be readjusted, although sometimes a complete adjustment is necessary. The materials used to form the band are generally selected to prevent wear (e.g., so as to maintain the top edge position). In the illustrated embodiment, the band 210 is formed from stainless steel. This type of material has greater wear resistance over the aluminum shoulder of the drum assembly shown in FIGS. 1-3. For example, it may have a Rockwell hardness of greater than 50 Rc. The thickness of the band may be widely varied. When using ½ in tape having a thickness between about 1 to 3 mils (as in Digital Betacam devices) a band thickness of about 0.009 inches to about 0.25 inches, and more particularly about 0.018 inches may be used.

The recess 212 is generally dimensioned a little larger than the band 210 so that the position of the band 210 may be adjusted. The depth of the recess 212 may coincide with the outer peripheral surface 204A of the lower drum 204 or it may be recessed further within the outer peripheral surface 204A of the lower drum 204. In the illustrated embodiment, the recess 212 is set at a depth beyond the outer peripheral surface 204A. This is generally done to prevent the tape from slipping into a gap formed between the surface 204A of the lower drum 204 and the band 210. By providing a greater depth, the band 210 is inserted past the outer peripheral surface 204A thereby protecting the gap therebetween. The recess depth may be widely varied. In most cases, the depth is configured as ½ the thickness of the band so as to place the tape proximate the center of the band 210 (as shown in FIG. 8D). By way of example, when using a band thickness of about 0.018 inches, the depth of the recess may be about 0.009 inches.

The top edge 214 may be continuous or it may be broken up by notches. In the illustrated embodiment, the adjustable band includes a plurality of notches 216. The notches 216 are configured to provide space for removing unwanted particles 218 formed during use. As such, the particles do not get trapped on the top edge of the adjustable band 210. The notch also reduces the twisting effect of the band when it is mounted to the drum. The shape of the notches 216 may be widely varied. For example, they may be curvilinear (e.g., hemisphere) or rectilinear (e.g., box like—square). In the illustrated embodiment, the notches are v shaped. This particular shape further helps to remove unwanted particles 218 from the top edge 214 of the band 210. The number of notches 216 may also be widely varied. There is generally a balance between the number of notches 216 and the tape contact surface area 220. In the illustrated embodiment, the notches 216 are spaced between the screws 213 As shown, there is generally one screw 213 between each of the notches 216. In some cases, two screws may be used at the entrance and exit locations to hold the position of the band 210 to a higher degree. The length and height of the v shaped notches 216 may also be widely varied. For example, the height may be between about 0.01 inches and about 0.100 inches, and more particularly about 0.020 inches, and the length may be between about 0.01 inches and about 0.100 inches, and more particularly about 0.020 inches.

As should be appreciated, bands that are draped helically around a drum tend to have edges that want to protrude radially away from the drum when mounted thereto. Therefore, in one embodiment, the outer edge of the band proximate the exit landing of the band includes a bend for sealing the exit landing of the band against the drum. Referring to FIG. 8F, the band 210 includes a tongue 230 that is mounted to the drum 204 via a screw 213 and that extends past the exit landing 232 of the band 210. The exit landing 232 is the place where the tape 201 exits the drum assembly 200, i.e., leaves the band 210. As shown, the tongue 230 includes a bend 234. The bend 234 may be placed almost anywhere on the tongue 230. In the illustrated embodiment, the bend 234 is placed at the interface between the exit landing 232 and the tongue 230. The bend 234 is configured to produce a spring action that forces the exit landing 232 against the outer peripheral surface of the drum 204.

While this invention has been described in terms of several preferred embodiments, there are alterations, permutations, and equivalents, which fall within the scope of this invention. For example, although the tools and methods of the present invention have been directed at drum assemblies of video recorders associated with digital beta formats (DVW, DNW, HDW), it should be noted that this is not a limitation and that the tools and methods may also be applied to drum assemblies of video recorders using other formats, as for example, other digital formats (D2/D1) or analog beta formats (SP Beta). It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of manufacturing a drum assembly associated with a digital video tape machine, the method comprising:
   providing a helical scan drum assembly having a stationary upper drum, a stationary lower drum and a plurality of rotating read/write heads disposed between the stationary upper and lower drums, the rotating read/write heads teading and writing digital information to and from a tape; and
   altering at least one of the stationary upper drum and the stationary lower drum so as to improve the performance of the helical scan drum assembly, wherein altering at least one of the stationary upper drum and stationary lower drum comprises inserting air grooves in an outer peripheral surface of the stationary upper drum, the air grooves being configured to reduce sticktion between a tape and the outer peripheral surface of the stationary upper drum when the tape is moved around the outer peripheral surface of the stationary upper drum,
   wherein the depth of each of the air grooves is between about 0.001 inches to about 0.020 inches, the height of each of the air grooves is between about 0.001 inches to about 0.020 inches, and the spacing between air grooves is between about 0.025 inches to about 0.100 inches, and wherein the position of a first air groove is spaced between about 0.100 inches to about 0.300 inches from the top of the rotating read/write heads.

2. The method as recited in claim 1 wherein the air grooves are positioned circumferentially around the entire upper drum.

3. The method as recited in claim 1 wherein the upper most air groove is placed at a location proximate the upper most contact point between the tape and the outer peripheral surface of the stationary upper drum.

4. The method as recited in claim 1 wherein the air groves have similar dimensions.

5. The method as recited in claim 1 wherein at least some of the air grooves have different dimensions.

6. A method of manufacturing a drum assembly associated with a digital video tape machine, the method comprising:
   providing a helical scan drum assembly having a stationary upper drum, a stationary lower drum and a plurality of rotating read/write heads disposed between the stationary upper and lower drums, the rotating read/write heads reading and writing digital information to and from a tape; and
   altering at least one of the stationary upper drum and the stationary lower drum so as to improve the performance of the helical scan drum assembly, wherein altering at least one of the stationary upper drum and stationary lower drum comprises:
      undersizing a diameter of the stationary upper drum;
      oversizing the undersized diameter of the stationary upper drum with a wear resistant material; and
      reducing the oversized diameter of the stationary upper drum so that the diameter of the stationary upper drum is within specified limitations.

7. The method as recited in claim 6 wherein altering at least one of the stationary upper drum and stationary lower drum comprises:
   inserting air grooves in an outer peripheral surface of the stationary upper drum, the air grooves being configured to reduce sticktion between a tape and the outer peripheral surface of the stationary upper drum when the tape is moved around the outer peripheral surface of the stationary upper drum; and
   mounting an adjustable band to an outer peripheral surface of the stationary lower drum, the adjustable band being configured to guide the tape around the drum assembly in accordance with helical scans when the tape is moved around the outer peripheral surface of the stationary upper drum.

8. The method as recited in claim 6 wherein the upper drum is undersized between about 0.001 to about 0.003 inches, and the total indicator run out is about 0.0005.

9. The method as recited in claim 6 wherein an outer peripheral surface of the stationary upper drum are formed from polished aluminum and wherein oversizing the undersized diameter of the stationary upper drum with a wear resistant material includes plating the outer peripheral surface of the stationary upper drum with Nickel.

10. The method as recited in claim 9 further comprising selecting the Rockwell hardness of the Nickel between 40 and 60 Rc.

11. The method as recited in claim 6 wherein the diameter of the upper drum is oversized between about 0.002 inches to about 0.004 inches.

12. The method as recited in claim 6 wherein reducing the oversized diameter of the stationary upper drum is performed via grinding.

13. A method of manufacturing a drum assembly associated with a digital video tape machine, the method comprising:
   providing a helical scan drum assembly having a stationary upper drum, a stationary lower drum and a plurality of rotating read/write heads disposed between the stationary upper and lower drums, the rotating read/write heads reading and writing digital information to and from a tape; and altering at least one of the stationary upper drum and the stationary lower drum so as to improve the performance of the helical scan drum assembly, wherein altering at least one of the stationary upper drum and lower drum comprises mounting an adjustable band to an outer peripheral surface of the stationary lower drum the adjustable band being configured to guide a tape around the drum assembly in accordance with helical scans when the tape is moved around the outer peripheral surface of the stationary upper drum and regulating a position of the adjustable band to adjust a tape position relative to the heads, thereby enabling the drum assembly to produce and improve signal.

14. The method as recited in claim 13 wherein altering at least one of the upper drum and lower drum further comprises:
undersizing a diameter of the stationary upper drum;
inserting grooves in an outer peripheral surface of the stationary upper drum;
oversizing the undersized diameter of the upper drum with a wear resistant material; and
reducing the oversized diameter of the stationary upper drum so that the diameter of the stationary upper drum is within specified limitations.

15. The method as recited in claim 13 wherein the adjustable band is mounted to the outer peripheral surface via screws, and wherein the position of the adjustable band is adjusted by loosening at least a portion of the screws and moving a top edge of the adjustable band to an appropriate height and thereafter tightening the loosened screws.

16. The method as recited in claim 13 wherein atop edge of the adjustable band is adjusted to a level or height that produces the best signal when the tape is rotated around the drum assembly.

17. The method as recited in claim 16 wherein the signal is adjusted to better than 10% of optimal.

18. The meted as recited in claim 13 adjusting the position of the adjustable band comprises:
setting the center of the adjustable band to a proper position;
setting the remainder of the adjustable band to a proper position, the remainder of the adjustable band being set from the center to edge of the adjustable band;
producing a signal by running the tape around the drum assembly; and
determining whether the signal is within a desired limit.

19. The method as recited in claim 18 further comprising resetting the adjustable band to a proper position if the signal is not within the desired limit.

20. The method as recited in claim 19 wherein resetting consists of only adjusting an edge of the adjustable band.

21. The method as recited in claim 19 wherein resetting consists of adjusting the entire adjustable band.

22. The method as recited in claim 13 wherein a thickness of the tape is between about 1 to 3 mils and further comprising selecting a thickness of the adjustable band between about 0.009 inches to about 0.25 inches.

23. A method of manufacturing a drum assembly associated with a digital betacam video tape machine, the method comprising:
providing a helical scan drum assembly having a stationary upper drum, a stationary lower drum and a plurality of rotating read/write heads disposed between the stationary upper and lower drums, the rotating read/write heads reading and wilting digital information to and from a tape, the lower drum including a shoulder for guiding a tape around the drum assembly; and
altering at least one of the stationary upper drum and the stationary lower drum so as to improve the performance of the helical scan drum assembly, wherein altering at least one of the upper drum and lower drum comprises:
removing the shoulder from the lower drum;
inserting a recess within an outer peripheral surface of the lower drum;
mounting an adjustable band within the recess; and
adjusting the position of the band relative to one or more heads of the drum assembly.

24. The method as recited in claim 23 wherein mounting the adjustable band includes tapping threads into the recess, and securing the adjustable band within the recess with screws that are received by the threads.

25. The method as recited in claim 23 wherein adjusting the position of the band includes loosening the screws and repositioning the band within the recess, and tightening the screws when the band is positioned in a desired location relative to the heads of the drum assembly.

26. The method as recited in claim 23 wherein the depth of the recess is flush or extends below a tape contact surface of the lower drum.

27. The method as recited in claim 23 wherein the depth of the recess is configured as substantially ½ the thickness of the adjustable band so as to place a tape proximate the center of the adjustable band.

28. A method of manufacturing a drum assembly associated with a digital video tape machine, the method comprising:
providing a helical scan drum assembly having a stationary upper drum, a stationary lower drum and a plurality of rotating read/write heads disposed between the stationary upper and lower drums, the rotating read/write heads reading and writing digital information to and from a tape; and
altering at least one of the stationary upper drum and the stationary lower drum so as to improve the performance of the helical scan drum assembly, wherein altering at least one of the stationary upper drum and stationary lower drum comprises:
removing a portion of the outer peripheral surface of the stationary upper drum so as to undersize the diameter of the stationary upper drum, and to increase the precision of the diameter of the stationary upper drum along its perimeter;
thereafter, adding the air grooves along the outer peripheral surface of the upper drum in at least the region the tape contacts the outer peripheral surface of the stationary upper drum, the air grooves being configured to reduce sticktion between a tape and the outer peripheral surface of the stationary upper drum when the tape is moved around the outer peripheral surface of the stationary upper drum:
thereafter, plating the outer peripheral surface of the stationary upper drum with a different material so as oversize the diameter of the stationary upper drum;
thereafter, removing a portion of the oversized diameter of the stationary upper drum until the desired diameter of the stationary upper drum is obtained; and
thereafter, polishing the outer peripheral surface of the stationary upper drum.

29. The method as recited in claim 28 wherein the removing a portion of the outer peripheral surface of the stationary upper drum and the adding air grooves along the outer peripheral surface of the stationary upper drum are performed via machining.

30. The method as recited in claim 28 wherein the plated material is selected to improve the hardness of the outer peripheral surface of the upper drum, to reduce sticktion between the tape and the outer peripheral surface of the upper drum, and to produce a non magnetic surface.

31. A method of manufacturing a drum assembly associated with a digital video tape machine, the method comprising:

providing a helical scan drum assembly having a stationary upper drum, a stationary lower drum and a plurality of rotating read/write heads disposed between the stationary upper and lower drums, the rotating read/write heads reading and writting digital information to and from a tape; and altering at least one of the stationary upper drum and the stationary lower drum so as to improve the performance of the helical scan drum assembly, wherein altering at least one of the stationary upper drum and lower drum comprises:

forming a recess in the stationary lower drum;

thereafter, mounting the adjustable band within the recess, the adjustable band being configured to guide a tape around the drum assembly in accordance with helical scans when the tape is moved around an outer perpheral surface of the stationary upper drum; and thereafter, adjusting the position of the adjustable band, the recess being dimensioned to receive the adjustable band while still allowing room for positional adjustments of the adjustable band therein.

32. The method as recited in claim 31 wherein the recess is formed in a shoulder of the stationary lower drum, the recess following the pat of the shoulder between an entrance and exit area of the stationary lower drum.

33. The method as recited in claim 31 wherein the recess is formed via machining.

34. The method as recited in claim 31 wherein the adjustable band is mounted in the recess via screws.

35. The method as recited in claim 31 wherein a top edge of the adjustable band is adjusted to a level or height that produces the best signal when the tape is rotated around the drum assembly.

36. The method as recited in claim 31 wherein the adjustable band includes a plurality of cut-outs spaced about the length of the adjustable band, the cut-outs helping dispense particulate formed when the drum assembly is in operation.

37. The method as recited in claim 31 wherein the adjustable band is formed from stainless steel.

38. The method as recited in claim 31 wherein the properties of the adjustable band are enhanced by lapping, nitrating or hard anodizing.

39. The method as recited in claim 31 adjusting the position of the adjustable band comprises:

setting the center of the adjustable band to a proper position;

setting the remainder of the adjustable band to a proper position;

producing a signal by running the tape around the drum assembly; and determining whether the signal is within a desired limit.

40. The method as recited in claim 39 wherein the remainder of the adjustable band is set from the center to edge of the adjustable band.

* * * * *

UNITED STATES PATENT AND TRADEMARK OFFICE
CERTIFICATE OF CORRECTION

PATENT NO. : 7,260,884 B2  Page 1 of 1
APPLICATION NO. : 10/414820
DATED : August 28, 2007
INVENTOR(S) : Athanasiou et al.

It is certified that error appears in the above-identified patent and that said Letters Patent is hereby corrected as shown below:

Claim 1        (Col. 11, line 40), change "tealing" to --reading--.

Claim 18       (Col. 13, line 37), change "meted" to --method--.

Claim 23       (Col. 13, line 65), change "wilting" to --writing--.

Claim 31       (Col. 15, line 13), change "writting" to --writing--.

Claim 31       (Col. 15, line 24), change "perpheral" to --peripheral--.

Claim 32       (Col. 15, line 32), change "pat" to --path--.

Signed and Sealed this

Eighteenth Day of November, 2008

JON W. DUDAS
*Director of the United States Patent and Trademark Office*